W. J. HOLDER.
HARNESS.
APPLICATION FILED NOV. 25, 1907.
No. 904,696. Patented Nov. 24, 1908.
2 SHEETS—SHEET 1.
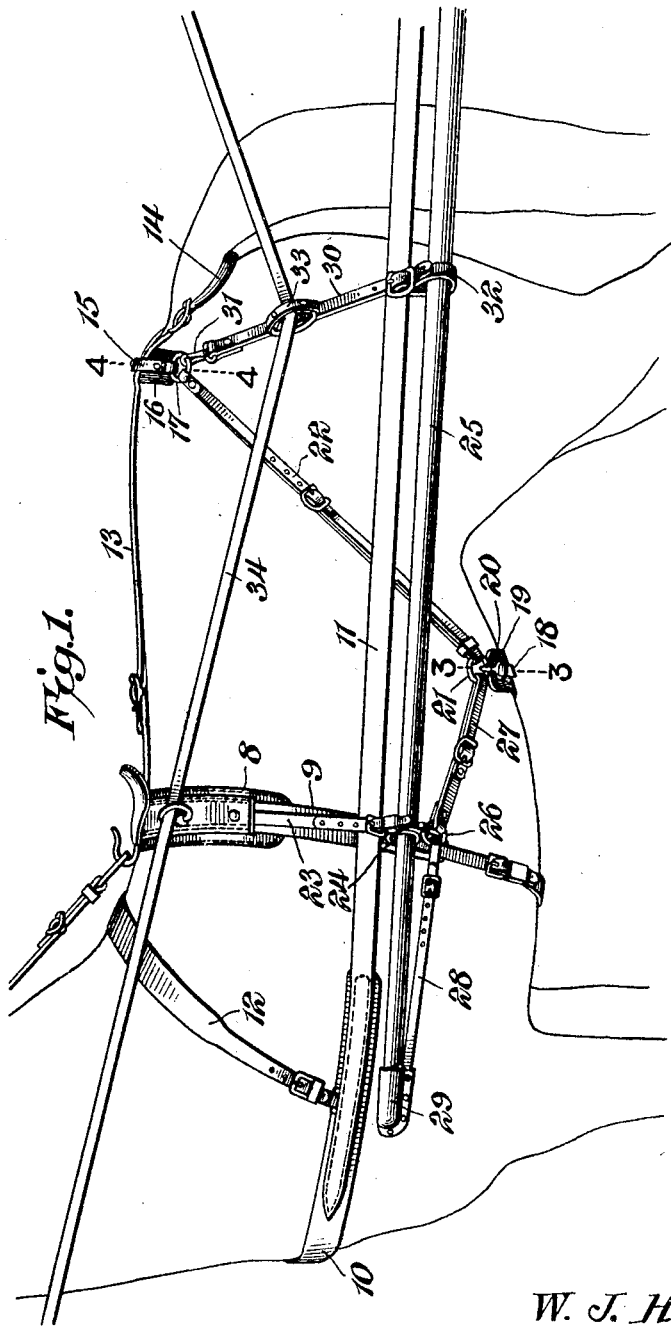
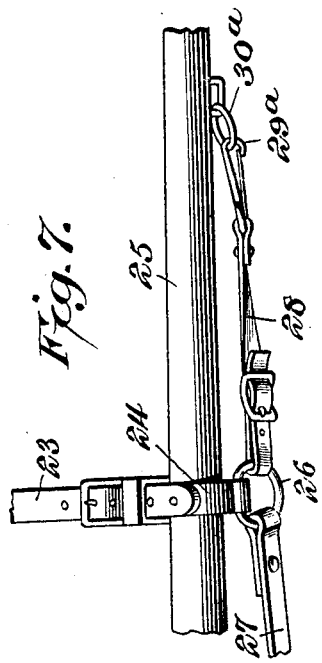
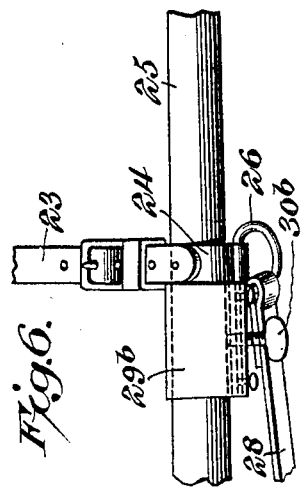
W. J. Holder, Inventor.
Witnesses
Howard D. Orr.
By E. G. Siggers
Attorney W. J. HOLDER.
HARNESS.
APPLICATION FILED NOV. 25, 1907.
904,696.
Patented Nov. 24, 1908.
2 SHEETS—SHEET 2.
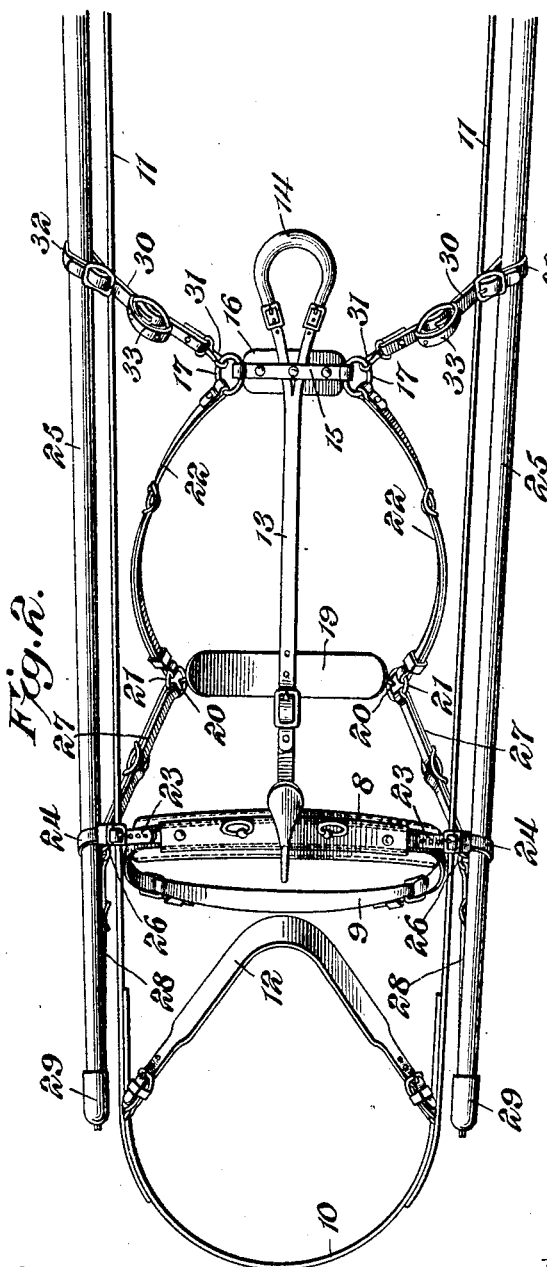
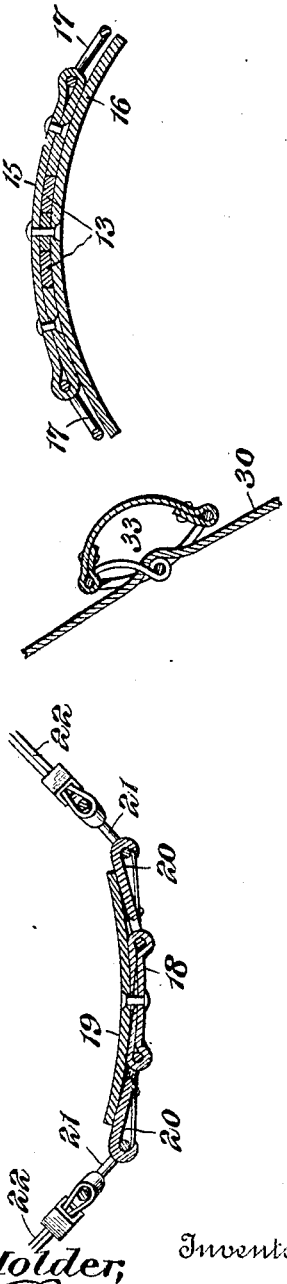
Witnesses
W. J. Holder, Inventor,
By
Attorney

UNITED STATES PATENT OFFICE.

WILLIAM JEFFERSON HOLDER, OF LONE OAK, TEXAS, ASSIGNOR OF ONE-FOURTH TO JAMES J. COPPEDGE AND ONE-FOURTH TO GROVER C. RABB, BOTH OF LONE OAK, TEXAS.

HARNESS.

No. 904,696.  Specification of Letters Patent.  Patented Nov. 24, 1908.

Application filed November 25, 1907. Serial No. 403,758.

*To all whom it may concern:*

Be it known that I, WILLIAM J. HOLDER, a citizen of the United States, residing at Lone Oak, in the county of Hunt and State of Texas, have invented a new and useful Harness, of which the following is a specification.

The principal object of the present invention is to provide novel hold-back mechanism to be employed in connection with harness, said mechanism eliminating the necessity of a breeching, thus producing a cleaner harness and one that leaves the animal's limbs entirely free, besides doing away with the necessity of slackness.

A further and important object is to provide a harness of this character that can be readily applied to and removed from an animal, and one that can be readily hitched to and unhitched from a vehicle; furthermore to provide a harness that will not wear upon the horse or other animal, and one that will afford a comparatively great degree of safety, thus being particularly applicable for use on young and inexperienced horses.

The preferred embodiment of the invention is illustrated in the accompanying drawings, wherein:—

Figure 1 is a side elevation of the harness showing it applied to an animal. Fig. 2 is a top plan view of the same. Fig. 3 is a detail sectional view substantially on the line 3—3 of Fig. 1. Fig. 4 is a detail sectional view substantially on the line 4—4 of Fig. 1. Fig. 5 is a detail sectional view through the rein guide. Fig. 6 illustrates a slightly different form of connection between the hold-back straps and the shafts or thills. Fig. 7 is still another embodiment of this portion of the invention.

Similar reference numerals designate corresponding parts in all the figures of the drawings.

The harness in so far as the forward draft is concerned is substantially that well known to the art. Thus in the present embodiment, a saddle 8 is provided, from which extends the usual girth or belly band 9. A breast strap 10 has connected thereto the traces 11, said breast strap being supported by a neck strap 12. A longitudinal back strap 13 extends from the saddle 8, and has attached to its rear end, the usual crupper 14.

As already stated in the present invention, the breeching is dispensed with, but instead a short transverse back strap 15 is connected centrally to the back strap 13 and crupper 14 at substantially their juncture. The strap 15 is supported upon a bearing or wear sheet 16, and carries at its ends rings 17. A short transverse belly strap 18 is located in rear of the girth 9, and carries on its upper side a comparatively broad bearing or wear sheet 19. The ends of the strap 18 are provided with snap hooks 20 engaged in rings 21. The rings 17 of the transverse back strap 15 are connected to the corresponding rings 21 of the belly strap 18 by extensible straps 22.

Suspended from the saddle 8 by straps 23 are the usual tugs 24 that support the shafts or thills 25. These tugs, as shown, carry depending rings 26, and said rings are connected to the rings 21 of the belly straps 18 by extensible straps 27. Forwardly extending hold-back straps 28, also connected to the rings 26 of the tugs, are arranged to be connected to the shafts or thills. Thus in the structure disclosed in Figs. 1 and 2, said straps 28 are fastened to cups 29 that detachably engage over the ends of the thills, while in the structure disclosed in Fig. 7, said strap 28 has a snap hook 29ª at its front end that is connected to a ring 30ª secured to the under side of the shaft or thill. Instead of hold-back straps, the tugs 24, as illustrated in Fig. 6, may be abutted against stop collars 29ᵇ mounted on the shafts or thills and held in place by set screws, as 30ᵇ. In any case, the result is substantially the same, but the cups 29 are probably preferred.

Where young, inexperienced or fractious animals are driven, straps 30 are preferably employed, and have snap hooks 31 at their upper ends, said snap hooks being located in the rings 17 of the transverse back strap 15. The lower ends of said straps 30 are looped about the shafts or thills, as illustrated at 32. These straps 30 may also be provided with intermediate loops 33 constituting guides for the reins 34, said guides thus maintaining the reins far enough away from the tail of the animal to prevent the same being placed thereover.

Experience has demonstrated that harness of this character constitutes effective means for holding back the vehicle without the use of a breeching, and thus leaves the animals' legs entirely free, avoiding worry to the animals and to the driver, and also providing a much cleaner harness. It will be evident that the animal may be hitched to or unhitched from the vehicle with ease and expedition, and in like manner the harness may be readily placed upon and removed from such animal. In a structure of this kind, moreover, practically all the slack can be taken out of the harness, eliminating to a very great degree the jerks and shocks in passing over rough places or when the animal changes his speed. While the straps 30 are not absolutely necessary, they are advantageous in that they not only assist in maintaining the parts in proper position, but prevent the animal kicking and by providing rein guides, will eliminate the danger of the animal placing his tail over the reins and thus holding them.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a harness of the character set forth, the combination with a girth, of shaft or thill supporting means associated with the girth, a crupper, a transverse back strap located in advance of the crupper, a transverse belly strap located in rear of the girth, downwardly and forwardly inclined straps connecting the ends of the back and belly straps and having their ends secured to the same, and forwardly and upwardly inclined straps connecting the ends of the belly strap and the thill supporting means and having their ends secured thereto.

2. In a harness of the character set forth, the combination with a girth, of shaft or thill supporting means associated with the girth, a crupper, a transverse back strap located in advance of the crupper, a transverse belly strap located in rear of the girth, terminal rings secured to the back strap, the belly strap and the shaft or thill supporting means, straps connecting and secured to the rings of the back and belly straps, and straps connecting and secured to the rings of the belly strap and shaft or thill supporting means.

3. In a harness, the combination with a saddle and girth, of tugs supported therefrom, a back strap extending rearwardly from the saddle, a crupper connected to the rear end of the back strap, a transversely disposed back strap secured to the first mentioned back strap in advance of the crupper, a transversely disposed belly strap located in a lower position between the transverse back strap and the girth, rings connected to the transverse back strap, the transverse belly strap and the tugs, straps connecting the rings of the transverse back strap and belly strap, and straps connecting the rings of the transverse belly strap and the tugs.

4. In a harness, the combination with a saddle and girth, of a longitudinal back strap extending from the saddle, a crupper connected to the rear end of the back strap, tugs supported from the saddle, a transverse back strap connected to the longitudinal back located in rear of the girth, straps connecting the ends of the transverse back and belly straps and secured thereto, straps connecting the ends of the transverse belly strap and the tugs and secured thereto, and other straps fastened to the ends of the transverse back strap and attachable to the shafts or thills.

5. In a harness of the character set forth, the combination with a girth and tugs, of transverse back and belly straps located in rear of the girth and tugs, the belly strap terminating below the horizontal line of the tugs, straps connecting and secured to the ends of the transverse back and belly straps, straps connecting and secured to the belly straps and tugs, and hold-back means associated with said tugs.

6. In harness, the combination with a girth and tugs, of transverse back and belly straps located in rear of the girth and tugs, the ends of the belly strap being located in a lower plane than the ends of the back strap, straps connecting the said ends of the transverse back and belly straps and also connecting the same and the tugs, hold-back straps connected to the tugs, and means for connecting the hold back straps to the thills or shafts.

7. In harness, the combination with a saddle and girth, of a longitudinal back strap, a crupper connected thereto, a transversely disposed back strap located substantially at the juncture of the crupper and longitudinal back strap, a belly strap located in rear of the girth, straps connecting the ends of the back straps and the belly strap, other straps connecting the ends of the belly strap and the tugs, forwardly extending hold back straps secured to the tugs and having means for detachably connecting the shaft or thill, and straps detachably connected to the transverse back strap and having means for detachably engaging the shafts or thills.

In testimony, that I claim the foregoing as my own, I have hereto affixed my signature in the presence of two witnesses.

WILLIAM JEFFERSON HOLDER.

Witnesses:
C. W. WATSON,
J. N. WHITE.